United States Patent
Kasaba et al.

(10) Patent No.: US 8,983,734 B2
(45) Date of Patent: Mar. 17, 2015

(54) VEHICLE LAMP CONTROL APPARATUS AND VEHICLE LAMP SYSTEM

(75) Inventors: Yusuke Kasaba, Shizuoka (JP);
Masashi Yamazaki, Shizuoka (JP);
Atsushi Toda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 307 days.

(21) Appl. No.: 13/474,858

(22) Filed: May 18, 2012

(65) Prior Publication Data

US 2012/0303223 A1    Nov. 29, 2012

(30) Foreign Application Priority Data

May 27, 2011    (JP) .................................. 2001-119359

(51) Int. Cl.
*B60R 22/00*    (2006.01)
*E05F 15/00*    (2006.01)
*G05D 1/00*    (2006.01)
*B60Q 1/10*    (2006.01)

(52) U.S. Cl.
CPC ............ *B60Q 1/10* (2013.01); *B60Q 2300/114* (2013.01); *B60Q 2300/116* (2013.01); *B60Q 2300/132* (2013.01); *B60Q 2300/324* (2013.01)
USPC .............. 701/49; 362/464; 362/465; 702/150

(58) Field of Classification Search
USPC .................... 701/49; 362/463, 464, 465, 466; 382/104; 702/150
See application file for complete search history.

(56) References Cited

U.S. PATENT DOCUMENTS 5,633,710 A * 5/1997 Kumra et al. ............ 356/139.08
6,430,521 B1 * 8/2002 Toda .............................. 702/150

FOREIGN PATENT DOCUMENTS

| EP | 2 402 212 A2 |   | 1/2012 |
|----|---|---|---|
| JP | 2000-085459 |   | 3/2000 |
| JP | 2001-341578 |   | 12/2001 |
| JP | 2004-314856 |   | 11/2004 |
| JP | 2006027300 A | * | 2/2006 |
| JP | 2009-126268 |   | 6/2009 |

OTHER PUBLICATIONS

European Patent Office, Search Report for Application No. 12169008.5 (dated Jan. 25, 2013).

* cited by examiner

*Primary Examiner* — Tuan C. To
*Assistant Examiner* — Isaac Smith
(74) *Attorney, Agent, or Firm* — Fish & Richardson P.C.

(57) ABSTRACT

Techniques are disclosed for enhancing the accuracy of auto-leveling control to adjust the optical axis of a vehicle lamp using an acceleration sensor. A controller stores reference values of first and second angles, updates the reference value of the second angle by treating a change of a sum angle during a vehicle stop as a change of the second angle, and updates the reference value of the first angle by treating a change of the sum angle when the vehicle is stopped as a change of the first angle. The controller derives a difference between a value of the sum angle and a sum of the reference values of the first and second angles, and corrects at least one of the reference values so as to reduce the difference.

5 Claims, 4 Drawing Sheets

VEHICLE LAMP CONTROL APPARATUS AND VEHICLE LAMP SYSTEM

CROSS REFERENCE TO RELATED APPLICATION(S)

The present application claims the benefit of priority of Japanese Patent Application No. 2011-119359 filed on May 27, 2011, the contents of which are incorporated herein by reference in their entirety.

FIELD

The present disclosure relates to a vehicle lamp control apparatus and a vehicle lamp system. More particularly, the disclosure relates to a vehicle lamp control apparatus and a vehicle lamp system, which are used in an automobile and the like.

BACKGROUND

Conventionally, auto-leveling control can adjust automatically an optical axis position of a vehicle headlamp according to a tilt angle of a vehicle, thereby changing an irradiating direction. Generally, in the auto-leveling control, a vehicle height sensor is used as a vehicle inclination detecting device. An optical axis position of a vehicle headlamp is adjusted, based on a vehicle pitch angle detected by the vehicle height sensor. In contrast with this, JP-A-2000-085459, JP-A-2004-314856, JP-A-2001-341578, and JP-A-2009-126268 disclose configurations for implementing the auto-leveling control using an acceleration sensor as the inclination detecting device.

In an implementation where an acceleration sensor is used as the vehicle inclination detecting sensor, an auto-leveling system can be provided at lower cost and lower weight, as compared with an implementation where a vehicle height sensor is used as the vehicle inclination detecting sensor. On the other hand, even in an implementation using the acceleration sensor, there is a request for performing the auto-leveling control with high accuracy by reducing errors in detection by the sensor.

SUMMARY

The present disclosure is made in view of such a problem. Thus, some implementations of the invention provide a technique for enhancing the accuracy of the auto-leveling control that adjusts the optical axis of a vehicle lamp using an acceleration sensor.

According to one aspect, a vehicle lamp control apparatus includes: a receiver for receiving an acceleration from which a tilt angle of a vehicle with respect to a horizontal plane is derivable, the acceleration being detected by an acceleration sensor; and a controller for controlling adjustment of an optical axis of a vehicle lamp, wherein a sum angle includes a first angle and a second angle, wherein the sum angle is the tilt angle of the vehicle with respect to the horizontal plane, wherein the first angle is a tilt angle of a road surface with respect to the horizontal plane, wherein a second angle is a tilt angle of the vehicle with respect to the road surface, wherein the controller stores the reference value of the first angle and a reference value of the second angle, wherein the controller updates the reference value of the second angle by treating change of the sum angle during vehicle stop as change of the second angle, wherein the controller outputs a control signal instructing adjustment of the optical axis according to the updated reference value of the second angle, wherein the controller updates the reference value of the first angle by treating, as change of the first angle, change of the sum angle during vehicle running (ie., traveling), and wherein the controller derives a difference between a value of the sum angle and a sum of the reference value of the first angle and the reference value of the second angle, and corrects at least one of the reference value of the first angle and the reference value of the second angle so as to reduce the difference.

According to the foregoing aspect, the accuracy of the auto-leveling control that adjusts the optical axis of a vehicle lamp using an acceleration sensor can be enhanced in some implementations.

In the foregoing aspect, the controller may derive the difference if the value of the sum angle is 0°. According to this aspect, the accuracy of the above correction may be enhanced.

Further, in the foregoing aspect, if the difference exceeds a predetermined threshold, the controller may correct the reference value by a correction value smaller than the predetermined threshold. According to this aspect, even if the accuracy of the above correction is low, a reference value of a first angle and/or that of a second angle can be made gradually closer to a provable value.

Further, according to another aspect, a vehicle lamp system includes: a vehicle lamp whose optical axis is adjustable; an acceleration sensor configured to detect an acceleration from which a tilt angle of a vehicle with respect to a horizontal plane is derivable; and a control apparatus for controlling adjustment of an optical axis of the vehicle lamp, wherein a sum angle includes a first angle and a second angle, wherein the sum angle is the tilt angle of the vehicle with respect to the horizontal plane, wherein the first angle is a tilt angle of a road surface with respect to the horizontal plane, wherein a second angle is a tilt angle of the vehicle with respect to the road surface, wherein the control apparatus stores the reference value of the first angle and a reference value of the second angle, wherein the control apparatus updates the reference value of the second angle by treating change of the sum angle during vehicle stop as change of the second angle, wherein the control apparatus outputs a control signal instructing adjustment of the optical axis according to the updated reference value of the second angle, wherein the control apparatus updates the reference value of the first angle by treating, as change of the first angle, change of the sum angle while the vehicle is traveling, and wherein the control apparatus derives a difference between the sum angle and a sum of the reference value of the first angle and the reference value of the second angle, and corrects at least one of the reference value of the first angle and the reference value of the second angle such that the difference comes close to 0.

According to this aspect, the accuracy of the auto-leveling control that adjusts the optical axis of a vehicle lamp using an acceleration sensor also may be enhanced.

Other aspects, features and possible advantages will be apparent from the following detailed description, the accompanying drawings, and the claims.

BRIEF DESCRIPTION OF THE DRAWINGS

A general configuration that incorporates various features is described with reference to the drawings. The drawings and the associated descriptions are provided to illustrate examples of the invention, but not to limit the scope of the invention.

DETAILED DESCRIPTION

Hereinafter, the invention is described, based on a preferred implementation with reference to the drawings. The same or equivalent components, members or processes illustrated in each drawing are designated with the same reference numeral. Redundant descriptions thereof appropriately are omitted. In addition, the preferred embodiment is not intended to limit the invention, but to exemplify it. Some implementations may include additional or different features and may omit some features described below.

First Embodiment

Figure 1:
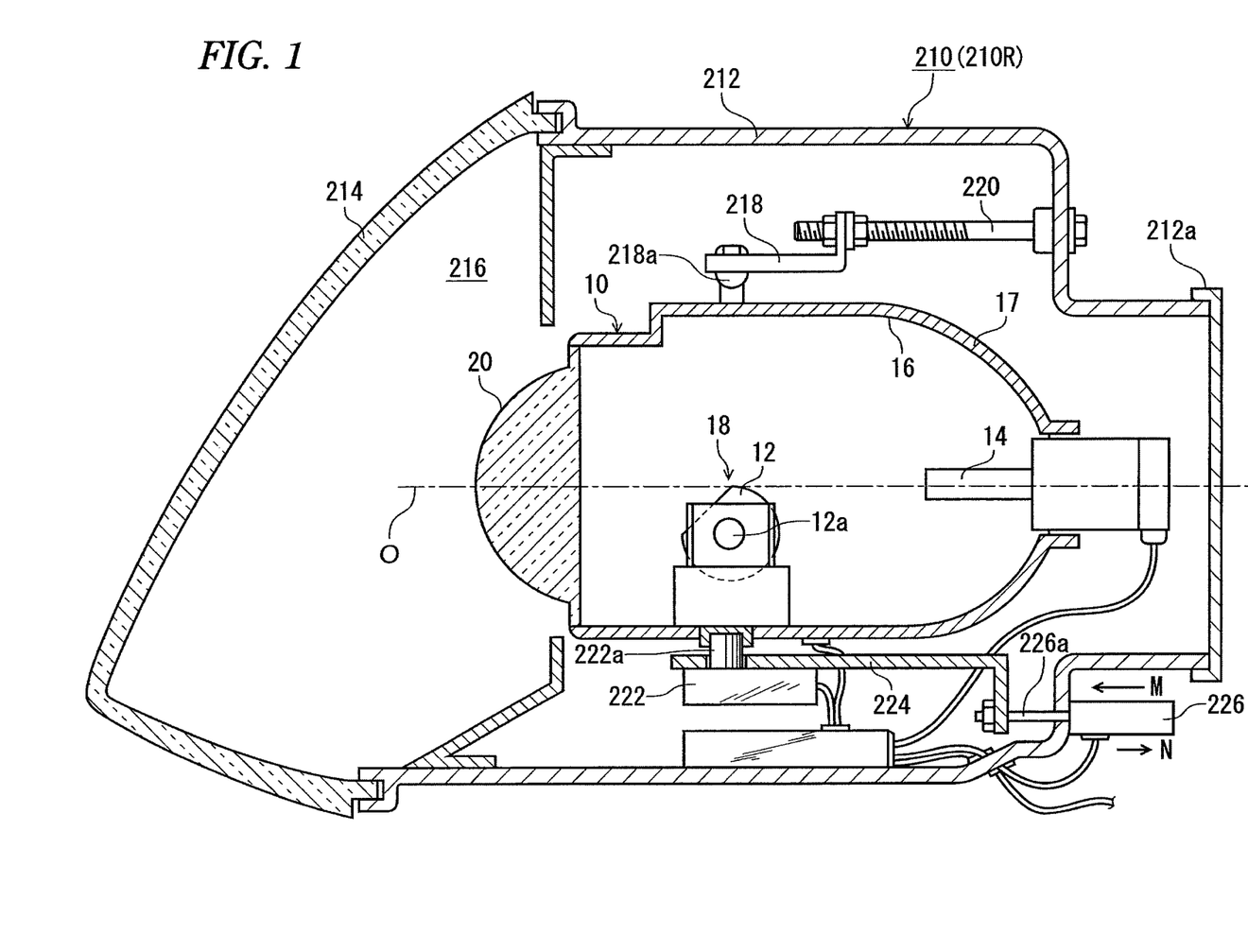
FIG. 1 is a schematic vertical cross-sectional view illustrating a headlamp unit that includes a lamp unit serving as a control target of a leveling electronic control unit (ECU) according to a First embodiment.

FIG. 1 is a schematic vertical cross-sectional view illustrating a headlamp unit that includes a lamp unit serving as a control target of a leveling electronic control unit (ECU) according to a first embodiment. The headlamp unit 210 has a structure in which a pair of headlight units with lateral symmetry are respectively disposed one-by-one on right and left sides in a vehicle-width direction of a vehicle. The headlight units have substantially the same structure, except that the headlight units have laterally symmetric structures. Thus, the structure of a right-side headlight unit 210R is described in detail below. Detailed description of a left-side headlight unit 210L appropriately is omitted.

The headlight unit 210R includes a lamp body 212 having an opening portion provided at the front side of the vehicle, and a translucent cover 214 covering the opening portion. The lamp body 212 includes a detachable cover 212a removable to the rear side of the vehicle. A lamp chamber 216 is formed of the lamp body 212 and the translucent cover 214. A lamp unit (vehicle lamp unit) 10 is housed in the lamp chamber 216.

In the lamp unit 10, a lamp bracket 218 is formed, which includes a pivot mechanism 218a serving as the center of the upward, downward, leftward, and rightward swings of the lamp unit 10. The lamp bracket 218 is screwed by aiming adjustment screws 220 rotatably supported on a wall surface of the lamp body 212. Accordingly, the lamp unit 10 is fixed to a predetermined position in the lamp chamber 216 determined by the adjustment state of the aiming adjustment screws 220. In addition, the attitude of the lamp unit 10 can be changed to a forward-bent attitude or a backward-inclined attitude around the pivot mechanism 218a with respect to the predetermined position. Additionally, a rotation shaft 222a of a swivel actuator 222 is fixed to the bottom surface of the lamp unit 10. The swivel actuator 222 is fixed to a unit bracket 224.

A leveling actuator 226 disposed on the exterior of the lamp body 212 is connected to the unit bracket 224. The leveling actuator 226 is configured, for example, by a motor for extending and contracting a rod 226a in the directions of arrows M and N. When the rod 226a is extended in the direction of arrow M, the lamp unit 10 swings around the pivot mechanism 218a to thereby take a backward-inclined attitude. On the other hand, when the rod 226a is contracted in the direction of arrow N, the lamp unit 10 swings around the pivot mechanism 218a to thereby take a forward-bent attitude. When the lamp unit 10 takes a backward-inclined attitude, leveling-adjustment can be performed in which a pitch angle of the lamp unit 10, i.e., an upward or downward tilt angle of the optical axis O with respect to a horizontal plane thereof is directed in an upward angular-direction. When the lamp unit 10 takes a forward-bent attitude, the leveling-adjustment can be performed in which the pitch angle of the lamp unit 10 is directed in a downward angular-direction.

The lamp unit 10 can include an aiming adjustment mechanism. An aiming pivot mechanism, serving as the center of swing during aiming-adjustment, is disposed at the connecting part between the rot 226a of the leveling-actuator 226 and the unit bracket 224. In addition, the aiming adjustment screws 220 are disposed in the lamp bracket 218 at intervals in a vehicle width direction. Then, the lamp unit 10 is pivoted upwardly, downwardly or laterally around the aiming pivot mechanism by rotating two of the aiming adjustment screws 220. Thus, the optical axis O can be adjusted in an upward, downward or lateral angular-direction.

The lamp unit 10 has a shade mechanism 18 including a rotary shade 12, a bulb 14 serving as a light source, a lamp housing 17 supporting a reflector 16 on an inner wall, and a projection lends 20. For example, an incandescent lamp, a halogen lamp, an electric-discharge lamp, or a light-emitting diode (LED) can be used as the bulb 14. The present implementation is an example in which the bulb 14 is configured as a halogen lamp. The reflector 16 reflects light output from the bulb 14. A part of the light output from the bulb 14 and the light reflected from the reflector 16 is guided through the rotary shade 12 to the projection lens 20.

The rotary shade 12 is a cylindrically-shaped member rotatable around a rotation shaft 12a and has a cutout portion that is cut away axially and partially, and multiple shade plates (not shown). The cutout portion or one of the shade plates is moved on the optical axis O, so that a predetermined light distribution pattern is formed. At least a part of the reflector 16 is shaped like an elliptically spherical surface. The elliptically spherical surface is provided such that a cross-sectional shape of the lamp unit 10 including the optical axis O is at least a part of an elliptical shape. An elliptic spherical portion of the reflector 16 has a first focal point at substantially the center of the bulb 14, and a second focal point on the rear focal plane of the projection lens 20.

The projection lens 20 is disposed on the optical axis O extending in an antero-posterior direction of the vehicle. The bulb 14 is disposed at the backward side of the rear focal plane serving as a focal plane including the rear focal point of the projection lens 20. The projection lens 20 is configured of a plano-convex aspheric lens having a front-side convex surface and a rear-side flat surface, and projects a light source image formed on the rear focal plane onto a virtual vertical screen located forward of the lamp unit 10 as an inverted image. The configuration of the lamp unit 10 is not limited to the foregoing one. The lamp unit 10 can be of the reflection type that does not have the projection lens 20.

Figure 2:
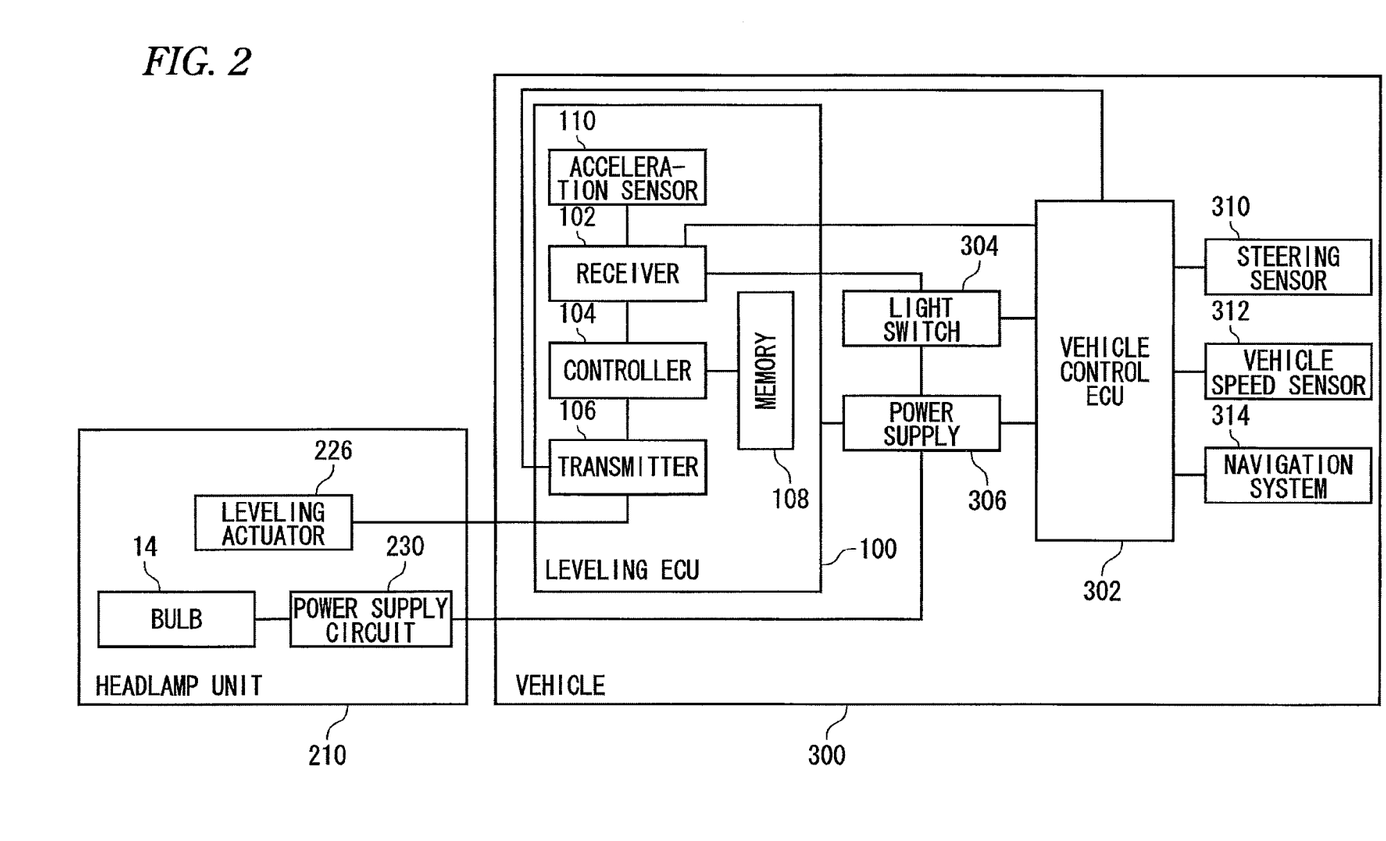
FIG. 2 is a functional block diagram illustrating operational cooperation among the headlamp unit, a vehicle control ECU, and a leveling ECU.

FIG. 2 is a functional block diagram illustrating operational cooperation among the headlamp unit, a vehicle control ECU, and a leveling ECU. As described above, the configurations of the right-side headlamp unit 210R and the left-side headlamp unit 210L are basically the same as one another. Thus, in FIG. 2, the headlamp units 210R and 210L are referred to collectively as the headlamp unit 210. The leveling ECU 100 is such that the hardware configuration thereof can be implemented by devices and circuits, such as a central processing unit (CPU) of a computer and a memory, and that the software configuration thereof can be implemented by computer programs and the like. However, in FIG. 2, the leveling ECU 100 is illustrated as a functional block realized by the cooperation of hardware and software. Accordingly, it is understood by those skilled in the art that these functional blocks thereof can be realized in various ways by the combinations of hardware and software.

The leveling ECU (vehicle lamp control apparatus) 100 includes a receiver 102, a controller 104, a transmitter 106, a memory 108, and an acceleration sensor 110. The leveling ECU 100 is installed, for example, in the vicinity of a dashboard of a vehicle 300. However, the installation position of the leveling ECU 100 is not limited to a specific one. The leveling ECU 100 can be provided, for example, in the headlamp unit 210. The acceleration sensor 110 can be provided outside the leveling ECU 100. A vehicle control ECU 302 and a light switch 304, which are mounted in the vehicle 300, are connected to the leveling ECU 100. Signals output from the vehicle control ECU 302 and the light switch 304 are received by the receiver 102. The receiver 102 receives output values of the acceleration sensor 110.

A steering sensor 310, a vehicle speed sensor 312, a navigation system 314 are connected to the vehicle control ECU 302. The vehicle control ECU 302 can receive various types of information from these sensors and transmit the received information to the leveling ECU 100. For example, the vehicle control ECU 302 transmits output values of the vehicle speed sensor 312 to the leveling ECU 100. Thus, the leveling ECU 100 can detect the traveling condition of the vehicle 300.

The light switch 304 transmits, to a power supply 306, the vehicle control ECU 302, the leveling ECU 100, a signal instructing to turn on/off the headlamp unit 210, a signal designating a light distribution pattern to be formed by the headlamp unit 210, and a signal instructing to execute auto-leveling control. For example, the light switch 304 transmits, to the leveling ECU 100, a signal instructing to execute auto-leveling control. Consequently, the leveling ECU 100 starts auto-leveling control.

A signal received by the receiver 102 is transmitted to the controller 104. The controller 104 derives change of the tilt angle of the vehicle 300, based on an output value of the acceleration sensor 110, which is sent from the receiver 102, and information stored in the memory 108 as need arises, and generates a control signal instructing to adjust the optical axis of the lamp unit 10. The controller 104 outputs the generated control signal to the leveling actuator 226 through the transmitter 106. The leveling actuator 226 is driven, based on the received control signal, so that the direction of the optical axis O of the lamp unit 10 is adjusted to an upward or downward angular-direction (i.e., the direction of the pitch angle of the vehicle 300).

The power supply 306 supplying electric-power to the leveling ECU 100, the vehicle control ECU 302, and the headlamp unit 210 is mounted in the vehicle 300. When it is instructed by operating the light switch 304 to turn on the headlamp unit 210, electric-power is supplied to the bulb 14 from the power supply 306 via the power supply circuit 230.

Figure 3:
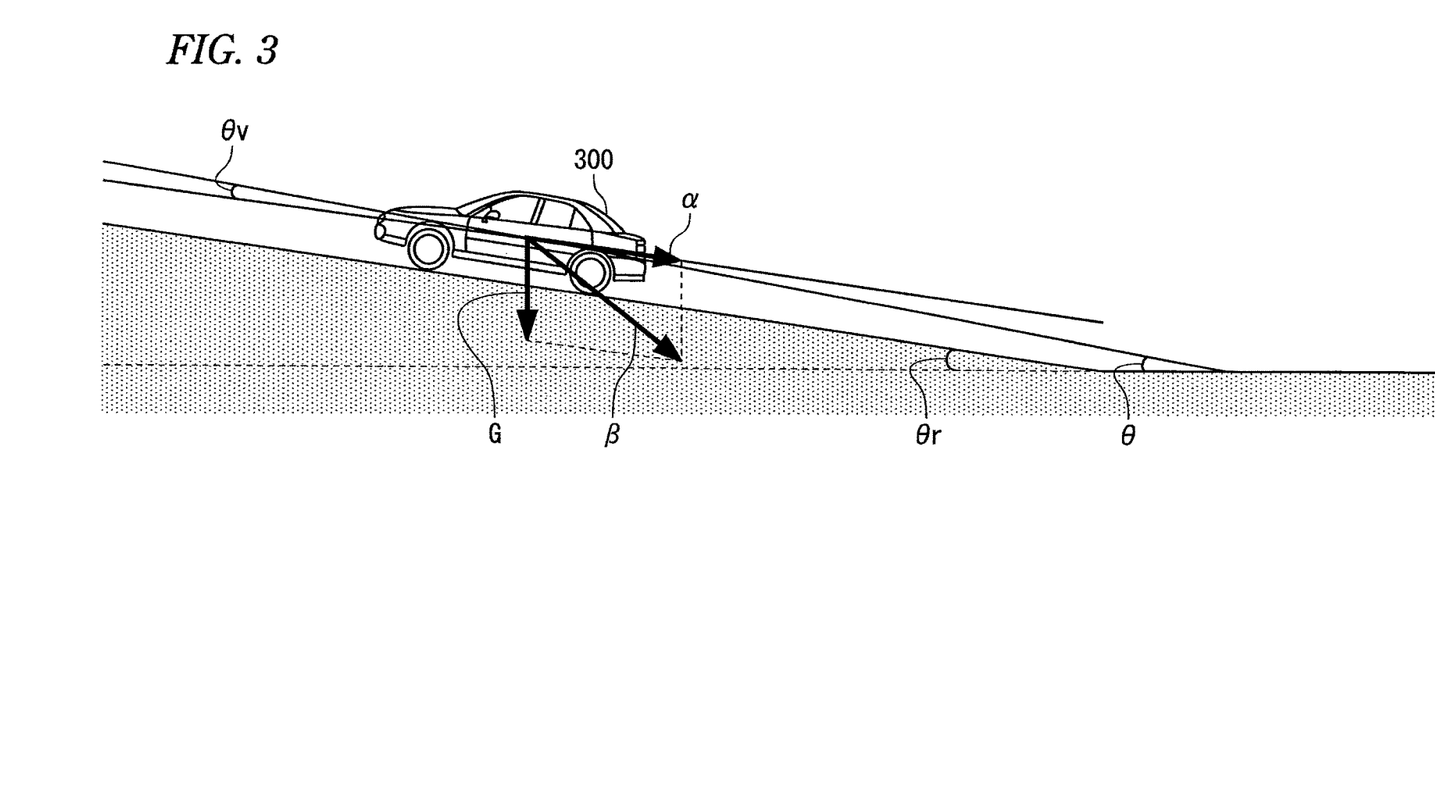
FIG. 3 is a schematic diagram illustrating an acceleration vector generated in a vehicle and the tilt angle of the vehicle which can be detected by an acceleration sensor.

Next, the auto-leveling control by the leveling ECU 100 having the above configuration is described in more detail. FIG. 3 is a schematic diagram illustrating an acceleration vector generated in a vehicle and the tilt angle of the vehicle which can be detected by an acceleration sensor.

For example, when a bag is loaded into a trunk at a vehicle rear portion, or when a person takes a rear seat, the vehicle takes a backward-inclined state. When the bag is unloaded therefrom, or when an occupant gets out of the vehicle, the state of the vehicle is changed from the backward-inclined one to a forward-bent one. The irradiating direction of the lamp unit 10 is changed in an upward or downward angular-direction in response to the state of the vehicle 300. Thus, a forward irradiation distance is increased or reduced. Then, the leveling ECU 100 derives change of the tilt angle in the pitch direction of the vehicle from an output value of the acceleration sensor 110, and controls the leveling actuator 226 to set the pitch angle of the lamp unit 10 at an angle according to the state of the vehicle. Thus, the attained distance of light irradiated forwardly therefrom can be adjusted optimally even when the state of the vehicle is changed by performing the auto-leveling control in which the leveling adjustment of the lamp unit 10 is performed based on the state of the vehicle.

The acceleration sensor 110 is, for example, a tri-axial acceleration sensor having X-axis, Y-axis, and Z-axis mutually orthogonal to one another. The acceleration sensor 110 is attached to the vehicle 300 in an optional attitude, and detects an acceleration vector generated in the vehicle 300. While the vehicle 300 is traveling, a gravity acceleration, and a motion acceleration occurring due to the movement of the vehicle 300 are generated therein. Thus, the acceleration sensor 110 can detect a composite acceleration vector $\beta$ obtained by the composition of a gravity acceleration vector G and a motion acceleration vector $\alpha$, as illustrated in FIG. 3. While the vehicle 300 is stopped, the acceleration sensor 110 can detect the gravity acceleration vector G. The acceleration sensor 110 outputs the numerical value of each axial component of the detected acceleration vector. The numerical values of X-axis, Y-axis, and Z-axis components are converted by the controller 104 into those of components respectively corresponding to the antero-posterior axis, the lateral axis, and the vertical axis of the vehicle.

The gradient of the vehicle with respect to the gravity acceleration vector G can be derived from the output value of the acceleration sensor 110. That is, a sum angle $\theta$ serving as the tilt angle of the vehicle 300 with respect to a horizontal plane can be derived from an acceleration detected by the acceleration sensor 110. The sum angle $\theta$ includes a road surface angle (first angle) $\theta r$ serving as the tilt angle of a road surface with respect to the horizontal plane, and a vehicle attitude angle (second angle) $\theta v$ serving as the tilt angle of the vehicle 300 with respect to the horizontal plane. Incidentally, the sum angle $\theta$, the road surface angle $\theta r$, and the vehicle attitude angle $\theta v$ are angles corresponding to upward and downward angular-directions of the antero-posterior axis of the vehicle 300, that is, angles respectively corresponding to the pitch directions of the vehicle 300.

The foregoing auto-leveling control aims at optimally maintaining the attained distance of light irradiated forwardly from the vehicle lamp by absorbing change of the forward irradiation distance of the vehicle lamp, which is caused by change of the tilt angle of the vehicle. Therefore, the tilt angle of the vehicle, which is necessary for the auto-leveling control, is the vehicle attitude angle $\theta v$. Thus, in the auto-leveling control using the acceleration sensor 110, it is desired to control the lamp unit 10 such that if change of the sum angle $\theta$ derived from a value detected by the acceleration sensor 110 is due to change of the vehicle attitude angle $\theta v$, the position of the optical axis of the lamp unit 10 is adjusted, and that if the change of the sum angle $\theta$ is due to change of the road surface angle $\theta r$, the position of the optical axis of the lamp unit 10 is maintained.

The controller 104 of the leveling ECU 100 performs control such that if the sum angle $\theta$ changes during vehicle stop, the optical axis is adjusted, and that if the sum angle $\theta$ changes during vehicle traveling, the adjustment of the optical axis is avoided. During vehicle traveling, it is rare that the load of a bag and the number of passengers increase or decrease, and that the vehicle attitude angle θv changes, change of the sum angle θ during vehicle traveling can be presumed as change of the road surface angle θr. On the other hand, during vehicle stop, it is rare that the road surface angle θr changes due to the movement of the vehicle 300. Thus, change of the sum angle θ during the stoppage of the vehicle can be presumed as change of the vehicle attitude angle θv.

For example, first, the vehicle 300 is put into a reference state by being placed on a horizontal plane in a vehicle maker's manufacturing plant or a dealer's maintenance facility. In the reference state, the vehicle 300 is brought into a condition in which one person gets in a driver seat of the vehicle. Then, an initialization signal is transmitted to the leveling ECU 100 for example, by operating a switch of an initialization device. When receiving the initialization signal via the receiver 102, the controller 104 starts initial aiming adjustment to adjust the optical axis O of the lamp unit 10 to an initialization position. In addition, the controller 104 causes the memory 108 to record, as the reference value (θr=0°) of the road surface angle (θr) and that (θv=0°) of the vehicle attitude angle (θv), an output value of the acceleration sensor 110 while the vehicle 300 is in the reference state. Thus, these reference values are stored therein.

In a situation in which the vehicle 300 is actually used, the controller 104 avoids adjustment of the optical axis for change of the sum angle θ during vehicle traveling. The controller 104 can avoid the adjustment of the optical axis by avoiding output of a control signal instructing the adjustment of the optical axis. Alternatively, the controller 104 can avoid the adjustment of the optical axis by generating a maintaining signal which instructs to maintain an optical axis position, and outputting the maintaining signal. In the case of avoiding output of the control signal, the controller 104 can avoid the output of the control signal by inhibiting the generation of the control signal. Alternatively, the controller 104 can avoid the output of the control signal by once generating the control signal and next inhibiting output of the generated control signal.

Whether the vehicle 300 is traveling can be determined by, e.g., a vehicle speed obtained from the vehicle speed sensor 312. The expression "during vehicle traveling" designates, e.g., a time-period from a moment at which the detection value of the vehicle speed sensor 312 exceeds 0, to a moment at which the detection value of the vehicle speed sensor 312 becomes 0. The time-period designated by the expression "during vehicle traveling" can appropriately be set based on experiments and simulation performed by vehicle-designers.

The controller 104 updates, as change of the road surface angle θr, the reference value of the road surface angle θr by treating change of the sum angle θ during vehicle traveling. For example, when the vehicle is stopped, the controller 104 calculates the difference Δθ1 in the sum angle θ between a moment before the vehicle runs, and a moment after the vehicle is stopped. Then, the controller 104 adds the obtained difference Δθ1 to the reference value of the road surface angle θr, which is recorded in the memory 108, to thereby calculate a new reference value of the road surface angle θr (the new reference value of the road surface angle θr=the recorded reference value of the road surface angle θr+Δθ1). The new reference value is recorded in the memory 108.

The controller 104 calculates the difference Δθ1, e.g., in the following manner. That is, immediately after the vehicle 300 starts moving, the controller 104 records the sum angle θ immediately before the vehicle 300 starts moving. When the vehicle is stopped, the controller 104 calculates the difference Δθ1 by subtracting the reference value of the sum angle θ from a current value (the value when the vehicle is stopped) of the sum angle θ. Incidentally, the controller 104 periodically receives accelerations from the acceleration sensor 110. The controller 104 stores the acceleration corresponding to each predetermined time, or the sum angle θ obtained from the acceleration.

The expression "when the vehicle is stopped" designates, e.g., a predetermined time since the detection value of the acceleration sensor 110 is stabilized after the detection value of the vehicle speed sensor 312 becomes 0. The expression "immediately after the vehicle starts moving" designates, e.g., a predetermined time since the detection value of the vehicle speed sensor 312 exceeds 0. The expression "immediately before the vehicle starts moving" designates, a predetermined time before the detection value of the vehicle speed sensor 312 exceeds 0. The time designated by each of the expressions "when the vehicle is stopped," "immediately after the vehicle starts moving," and "immediately before the vehicle starts moving" can appropriately be set, based on experiments or simulations by the designer.

If the difference between the calculated reference value of the road surface angle θr and the reference value thereof recorded in the memory 108 is equal to or more than a predetermined amount, the controller 104 can update the reference value of the road surface angle θr. Consequently, the reference value of the road surface angle θr can be prevented from frequently being rewritten. A burden to the controller 104 can be reduced. The life of the memory 108 can be increased.

During vehicle stop, the controller 104 updates the reference value of the vehicle attitude angle θv by treating change of the sum angle θ during the vehicle stop as change of the vehicle attitude angle θv. In addition, the controller 104 outputs, via the transmitter 106, a control signal instructing the adjustment of the optical axis of the lamp unit 10 according to the updated reference value of the vehicle attitude angle θv. The reference value of the sum angle θ, which is used at that time, is set as follows. For example, during vehicle stop, the controller 104 calculates the difference Δθ2 between the current value of the sum angle θ and the reference value thereof recorded in the memory 108. For example, after the vehicle 300 is stopped, at a first calculation of the difference Δθ2, the used value of the sum angle θ is the reference value thereof updated after the difference Δθ1 is calculated. That is, the used value of the sum angle θ is the value thereof when the vehicle 300 is stopped. At a second calculation of the difference Δθ2 or later, the used value of the sum angle θ is the reference value thereof updated after the last calculation of the difference Δθ2. Then, the controller 104 calculates a new reference value of the vehicle attitude angle θv by adding the obtained difference Δθ2 to the reference value of the vehicle attitude angle θv recorded in the memory 108 (the new reference value of the vehicle attitude angle θv=the recorded reference value of the vehicle attitude angle θv+Δθ2). The new reference value is recorded in the memory 108.

Incidentally, during vehicle stop, if there is change (oscillation) of the acceleration, from which a vehicle attitude change that requires the adjustment of the optical axis O of the lamp unit 10 is deduced, the controller 104 can update the reference value of the vehicle attitude angle θv and output a control signal. Vehicle attitude changes due to variations of load to the vehicle 300, for example, the boarding/unboarding of passengers and the loading/unloading of baggage can be cited as examples of the vehicle attitude change that requires the adjustment of the optical axis O of the lamp unit 10.

The expression "during vehicle stop" designates, e.g., a time since the detection value of the acceleration sensor 110 is stabilized until the vehicle starts moving. A moment at which "the vehicle starts moving" is, e.g., that at which the detection value of the vehicle speed sensor 312 exceeds 0. The time designated by the expression "during vehicle stop" can appropriately be set, based on an experiment or simulation by a vehicle-designer.

If the difference between the calculated reference value of the vehicle attitude angle θv and the reference value thereof recorded in the memory 108 is equal to or more than a predetermined amount, the controller 104 can update the reference value of the vehicle attitude angle θv. Consequently, the rewriting of the reference value of the vehicle attitude angle θv, and the adjustment of the optical axis can be prevented from frequently being performed. A burden to the controller 104 can be reduced. The life of each of the memory 108 and the leveling actuator 226 can be increased.

The controller 104 performs correction-processing on the reference value of the road surface angle θr and/or that of the vehicle attitude angle θv at a predetermined timing. That is, theoretically, a sum of the reference value of the road surface angle θr and/or that of the vehicle attitude angle θv is a sum angle θ (the value of the angle θ=the reference value of the angle θr+that of the angle θv). Thus, the controller 104 obtains an error component Δθe, which is the difference between the value of the sum angle θ and a total of the reference value of the road surface angle θr and that of the vehicle attitude angle θv, by subtracting a sum of the reference value of the road surface angle θr and that of the vehicle attitude angle θv from the value of the sum angle θ, which is obtained at the time of performing the correction-processing (i.e., currently obtained) (the value of the component Δθe=the value of the angle θ−(the reference value of the angle θr+that of the angle θv)). Then, the controller 104 corrects at least one of the reference value of the road surface angle θr+that of the vehicle attitude angle θv to thereby reduce the error component Δθe.

For example, the controller 104 performs the correction-processing when the reference value of the road surface angle θr is updated, and when the reference value of the vehicle attitude angle θv is updated. In this case, for example, when the reference value of the road surface angle θr is updated, the controller 104 calibrates the reference value of the vehicle attitude angle θv. When the reference value of the vehicle attitude angle θv is updated, the controller 104 calibrates the reference value of the road surface angle θr.

The controller 104 can perform correction-processing when the sum angle θ is 0°. The acceleration sensor 110 is nonuniform in sensor-sensitivity and has a sensor-offset. Thus, the acceleration sensor 110 has the sensor characteristic that the larger the deviation from the value (0°) in the reference state of the sum angle θ, the greater the detection error. Therefore, the accuracy of correction-processing can be improved by performing the correction-processing when the sum angle θ is 0°.

The sum angle θ becomes 0° when the road surface and the vehicle attitude are horizontal (i.e., the road surface angle θr=the vehicle attitude angle θv=0°), and when the road surface and the vehicle attitude are respectively inclined in opposite directions to cancel the inclinations of the road surface and the vehicle attitude (i.e., the road surface angle θr≠0°, the vehicle attitude angle θv≠0°, and the value of the road surface angle θr+that of the vehicle attitude angle θv=0°). Accordingly, in a situation in which the sum angle θ is 0°, both the road surface and the vehicle attitude are horizontal or substantially horizontal. At least, it can be deduced that the road surface is not steeply inclined. Thus, improvement in the accuracy of the correction-processing can be expected by performing the correction-processing in a situation in which the actual condition of each of the road surface and the vehicle attitude is presumed.

For example, if the absolute value of the obtained error component Δθe exceeds a predetermined threshold θth (|Δθe|>θth), the controller 104 corrects at least one of the reference value of the road surface angle θr and the reference value of the vehicle attitude angle θv by a correction value θc.

The "predetermined threshold value θth" can be set according to the resolution of the optical axis control or that of the angle detection using the acceleration sensor 110. The threshold value θth is set within an error range in which errors don't hinder the optical axis control. The "correction value θc" is set according to the accuracy of the detection of the error component Δθe. For example, the correction value θc is set at a value smaller than the predetermined threshold θth. Consequently, even if the accuracy of the detection of the error component Δθe is low, the reference value of the road surface angle θr and that of the vehicle attitude angle θv can gradually be made closer to probable values.

For example, the resolution of the detection of the angle using the acceleration sensor 110 is 0.04°. The threshold θth is set at 0.1°. The "predetermined threshold θth" and the "correction value θc" may be properly set based on experiments and simulation performed by vehicle designers. The correction value θc is set at 0.03°. The "predetermined threshold θth" and the "correction value θc" may be variable according to a correction-processing execution situation, including the conditions of the road surface and the vehicle attitude/state.

Figure 4:
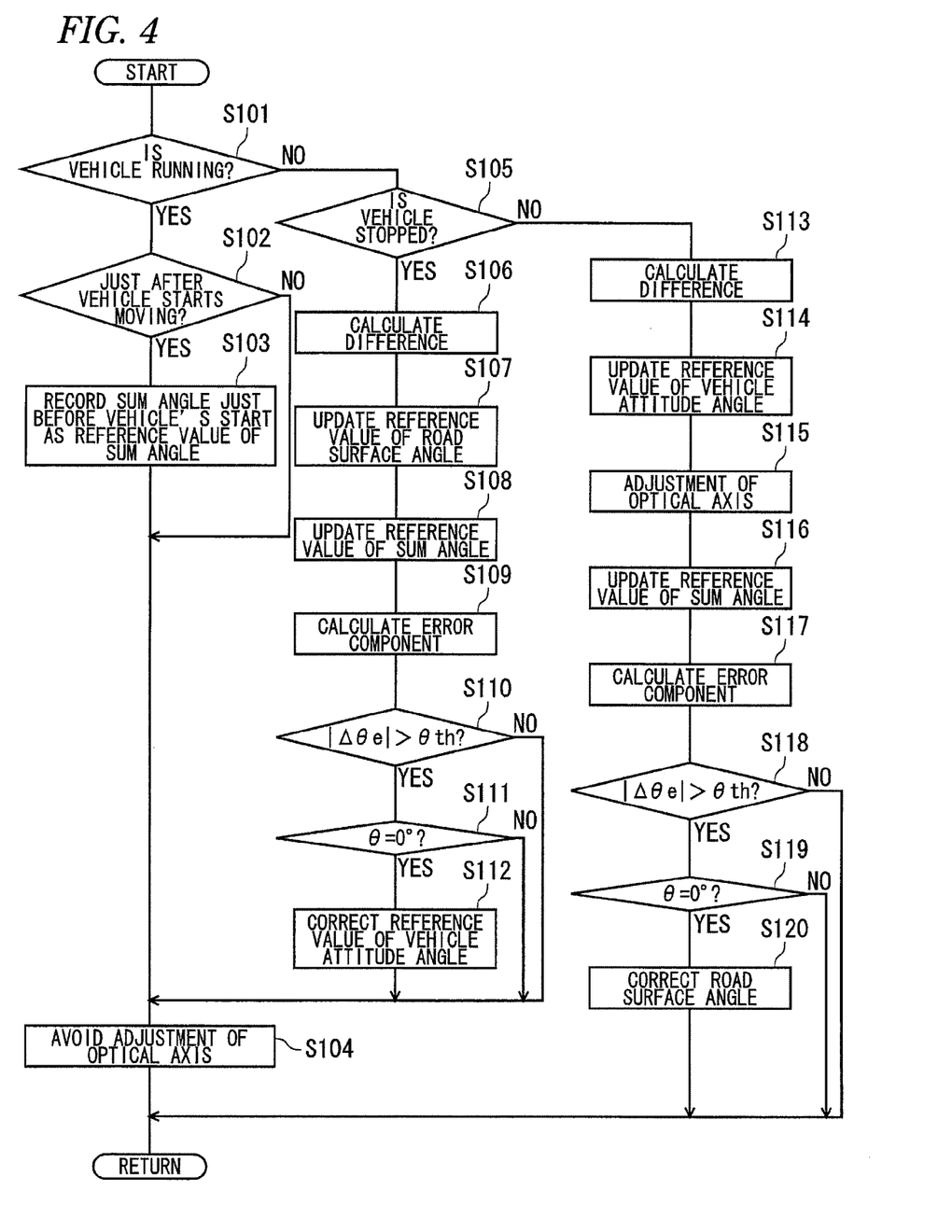
FIG. 4 is a flowchart illustrating an auto-leveling control procedure executed by the leveling ECU according to the First embodiment.

FIG. 4 is a flowchart illustrating an auto-leveling control procedure executed by the leveling ECU according to the first embodiment. In the flowchart shown in FIG. 4, the procedure executed by each portion according to the first embodiment is illustrated by showing steps each of which is designated by a combination of a letter "S" (i.e., the capital letter of "Step") and a numeral. The flow is repeatedly executed by the controller 104 at predetermined timings when ignition is "on" in a state in which the execution of the flow in an auto-leveling control mode is instructed by the light switch 304. If the ignition is off, the execution of the flow is finished.

In step S101, the controller 104 determines whether the vehicle 300 is running. If the vehicle 300 is running (Y in step S101), in step S102, the controller 104 determines whether the vehicle 300 is in a state just after the vehicle 300 starts moving. If the vehicle 300 is in a state just after the vehicle 300 starts moving (Y in step S102), in step S103, the controller 104 records (or updates), as the reference value of the sum angle θ, the sum angle θ just before the vehicle 300 starts moving, in the memory 108. In step S104, the controller 104 avoids the adjustment of the optical axis. Then, the controller 104 finishes the present routine. If the vehicle 300 is not in a state just after the vehicle 300 starts moving (N in step S102), the controller 104 does not update the reference value of the sum angle θ. Thus, the controller 104 avoids the adjustment of the optical axis. Then, in step S104, the controller 104 finishes the present routine.

If the vehicle 300 is not running (N in step S101), in step S105, the controller 104 determines whether the vehicle 300 is stopped. If the vehicle 300 is stopped (Y in step S105), in step S106, the controller 104 calculates the difference Δθ1 by subtracting the reference value of the sum angle θ from the current value of the sum angle θ. Then, in step S107, the controller 104 calculates a new reference value of the road surface angle θr from the calculated difference Δθ1 and the reference value of the road surface angle θr, which is recorded in the memory 108. Next, the controller 104 updates the reference vale of the surface road angle θr. Then, in step S108, the controller 104 causes the memory 108 to record the current value of the sum angle θ as the new reference value thereof.

Next, in step S109, the controller 104 calculates the error component Δθe. In step S110, the controller 104 determines whether the absolute value of the error component Δθe exceeds the threshold θth. If the absolute value of the error component Δθe exceeds the threshold θth (Y in step S110), in step S111, the controller 104 determines whether the current value of the sum angle θ is 0°. If the current value of the sum angle θ is 0° (Y in step S111), in S112, the controller 104 corrects the reference value of the vehicle attitude angle θv by the correction value θc. In step S104, the controller 104 avoids the adjustment of the optical axis. Then, the controller 104 finishes the present routine. If the absolute value of the error component Δθe is equal to or less than the threshold θth (N in step S110), in step S104, the controller 104 does not execute correction-processing and avoids the adjustment of the optical axis. Then, the controller 104 finishes the present routine. If the sum angle θ is not 0° (N in step S111), similarly, in step S104, the controller 104 does not execute correction-processing. In step S104, the controller 104 does not execute correction-processing and avoids the adjustment of the optical axis. Then, the controller 104 finishes the present routine.

If the vehicle 300 is not stopped (N in step S105), this fact means that the vehicle is during vehicle stop. Thus, in step S113, the controller 104 calculates the difference Δθ2 by subtracting the reference value of the sum angle θ from the current value thereof. In step S114, the controller 104 calculates the new reference value of the vehicle attitude angle θv from the calculated reference value Δθ2 and the reference value of the vehicle attitude angle θv, which is recorded in the memory 108, and updates the reference value of the vehicle attitude angle θv. Then, in step S115, the controller 104 performs the adjustment of the optical axis according to the updated reference value of the vehicle attitude angle θv. In step S116, the controller 104 records the current value of the sum angle θ in the memory 108 as the new reference value of the sum angle θ.

Next, in step S117, the controller 104 calculates the error component Δθe. In step S118, the controller 104 determines whether the absolute value of the error component Δθe exceeds the threshold θth. If the absolute value of the error component Δθe exceeds the threshold θth (Y in step S118), in step S119, the controller 104 determines whether the current value of the sum angle θ is 0°. If the current value of the sum angle θ is 0° (Y in step S119), in step S120, the controller 104 corrects the reference value of the road surface angle θr by the correction value θc. Then, the controller 104 finishes the present routine. If the absolute value of the error component Δθe is equal to or less than the threshold θth (N in step S118), the controller 104 finishes the present routine without executing correction-processing. If the value of the sum angle θ is not 0° (N in step S119), similarly, the controller 104 finishes the present routine without executing correction-processing.

As described above, the leveling ECU 100 according to the present embodiment updates the reference value of the vehicle attitude angle θv by treating change of the sum angle θ during vehicle stop as change of the value of the vehicle attitude angle θv. In addition, the controller 104 updates the reference value of the road surface angle θr by treating, as change of the value of the road surface angle θr, change of the sum angle θ during vehicle traveling. In addition, the leveling ECU 100 derives the difference between the value of the sum angle θ and a sum of the reference value of the road surface angle θr and the reference value of the vehicle attitude angle θv. Then, the leveling ECU 100 corrects at least one of these two reference values. Thus, the accuracy of the auto-leveling control performing the adjustment of the optical axis of the lamp unit 10 using the acceleration sensor 110 can be enhanced.

For example, a method has been considered, which utilizes the fact that a sum of the value of the road surface angle θr and that of the vehicle attitude angle θv is the value of the sum angle θ, thereby to calculate the new value of the road surface angle θr by subtracting the reference value of the vehicle attitude angle θv from the value of the sum angle θ and to calculate the new value of the vehicle attitude angle θv by subtracting the reference value of the vehicle attitude angle θv from the value of the sum angle θ. According to this method, the error component included by the reference value of the road surface angle θr is included by the value of the vehicle attitude angle θv. In addition, the error component included by the reference value of the vehicle attitude angle θv is included by the value of the road surface angle θr. Thus, an accumulation of errors occurs. In contrast with this method, the leveling ECU 100 derives a new value of the road surface angle θr by adding, to the reference value of the road surface angle θr, the difference Δθ1 which is change of the sum angle during vehicle traveling. In addition, the leveling ECU 100 derives a new value of the vehicle attitude angle θv by adding, to the reference value of the vehicle attitude angle θv, the difference Δθ2 which is change of the sum angle during vehicle stop. Thus, according to the leveling ECU 100 according to the present embodiment, such an accumulation of errors can be avoided.

The leveling ECU 100 can include the receiver 102 configured to receive an acceleration detected by the acceleration sensor 110, and the controller 104 configured to execute the above auto-leveling control.

The vehicle lamp system can include the lamp unit 10, the acceleration sensor 110, and the leveling ECU 100 (according to the first embodiment, the leveling ECU 100 includes the acceleration sensor 110).

It is to be understood that the present invention is not limited to the specific implementations described above and that various modifications are possible without departing from the spirit and scope of the present invention. Accordingly, other implementations are within the scope of the claims.

What is claimed is:

1. A vehicle lamp control apparatus comprising:
   a receiver configured to receive an acceleration from which a tilt angle of a vehicle with respect to a horizontal plane is derivable, the acceleration being detected by an acceleration sensor; and
   a controller configured to control adjustment of an optical axis of a vehicle lamp, wherein a sum angle includes a first angle and a second angle, wherein the sum angle is the tilt angle of the vehicle with respect to the horizontal plane, wherein the first angle is a tilt angle of a road surface with respect to the horizontal plane, wherein the second angle is a tilt angle of the vehicle with respect to the road surface,
   wherein the controller stores the reference value of the first angle and a reference value of the second angle, wherein the controller updates the reference value of the second angle by treating change of the sum angle during vehicle stop as change of the second angle, wherein the controller outputs a control signal instructing adjustment of the optical axis according to the updated reference value of the second angle, wherein the controller updates the reference value of the first angle by treating, as change of the first angle, change of the sum angle when the vehicle is stopped, and wherein the controller derives a difference between a value of the sum angle and a sum of the reference value of the first angle and the reference value of the second angle, and corrects at least one of the reference value of the first angle and the reference value of the second angle so as to reduce the difference.

2. The vehicle lamp control apparatus according to claim 1, wherein the controller derives the difference if the value of the sum angle is 0°.

3. The vehicle lamp control apparatus according to claim 1, wherein the controller corrects, if the difference exceeds a predetermined threshold, the reference value by a correction value smaller than the predetermined threshold.

4. The vehicle lamp control apparatus according to claim 2 wherein the controller corrects, if the difference exceeds a predetermined threshold, the reference value by a correction value smaller than the predetermined threshold.

5. A vehicle lamp system comprising:
a vehicle lamp whose optical axis is adjustable;
an acceleration sensor configured to detect an acceleration from which a tilt angle of a vehicle with respect to a horizontal plane is derivable; and
a control apparatus configured to control adjustment of an optical axis of the vehicle lamp, wherein a sum angle includes a first angle and a second angle, wherein the sum angle is the tilt angle of the vehicle with respect to the horizontal plane, wherein the first angle is a tilt angle of a road surface with respect to the horizontal plane, wherein the second angle is a tilt angle of the vehicle with respect to the road surface, wherein the control apparatus stores the reference value of the first angle and a reference value of the second angle, wherein the control apparatus updates the reference value of the second angle by treating change of the sum angle during vehicle stop as change of the second angle, wherein the control apparatus outputs a control signal instructing adjustment of the optical axis according to the updated reference value of the second angle, wherein the control apparatus updates the reference value of the first angle by treating, as change of the first angle, change of the sum angle when the vehicle is stopped, and wherein the control apparatus derives a difference between the sum angle and a sum of the reference value of the first angle and the reference value of the second angle, and corrects at least one of the reference value of the first angle and the reference value of the second angle such that the difference comes close to 0.

* * * * *

UNITED STATES PATENT AND TRADEMARK OFFICE
CERTIFICATE OF CORRECTION

| | | |
|---|---|---|
| PATENT NO. | : 8,983,734 B2 | Page 1 of 1 |
| APPLICATION NO. | : 13/474858 | |
| DATED | : March 17, 2015 | |
| INVENTOR(S) | : Kasaba et al. | |

It is certified that error appears in the above-identified patent and that said Letters Patent is hereby corrected as shown below:

On the title page, item (30), delete "2001-119359" and insert --2011-119359--.

Signed and Sealed this
Twenty-seventh Day of October, 2015

Michelle K. Lee
*Director of the United States Patent and Trademark Office*